Figure 1:
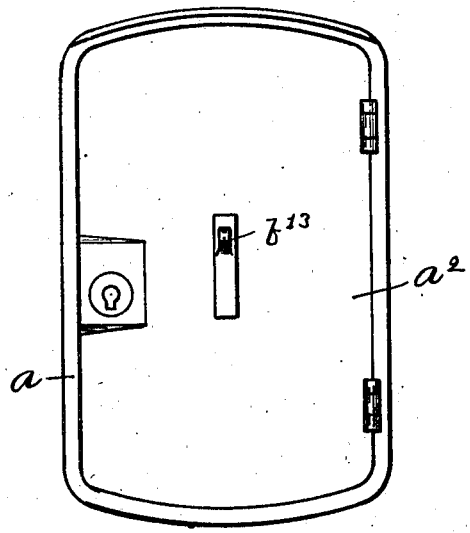

F. W. COLE.
FIRE AND POLICE TELEGRAPH SYSTEM.
APPLICATION FILED SEPT. 27, 1907.

970,886.

Patented Sept. 20, 1910.
5 SHEETS—SHEET 1.

Witnesses:
H. B. Davis
Cynthia Doyle

Inventor:
Frederick W. Cole
by Noyes & Harriman
attys.

F. W. COLE.
FIRE AND POLICE TELEGRAPH SYSTEM.
APPLICATION FILED SEPT. 27, 1907.

970,886.

Patented Sept. 20, 1910.

5 SHEETS—SHEET 2.

Witnesses:
H. B. Davis.
Cynthia Doyle

Inventor:
Frederick W. Cole
by Noyes & Hanninan
attys.

F. W. COLE.
FIRE AND POLICE TELEGRAPH SYSTEM.
APPLICATION FILED SEPT. 27, 1907.
970,886.
Patented Sept. 20, 1910.
5 SHEETS—SHEET 3.
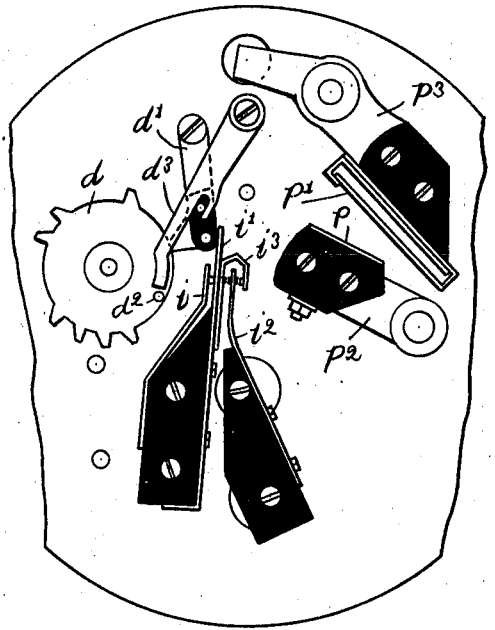
Fig. 8.
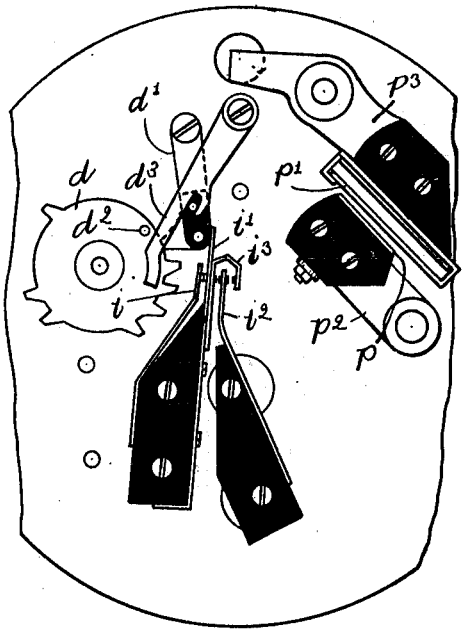
Fig. 9.
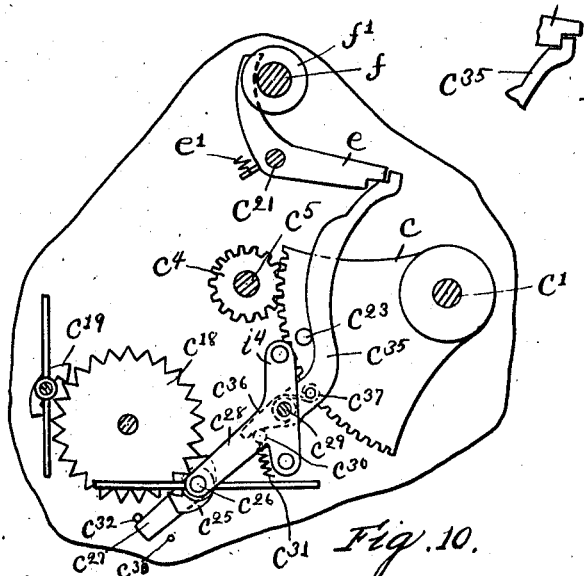
Fig. 10.
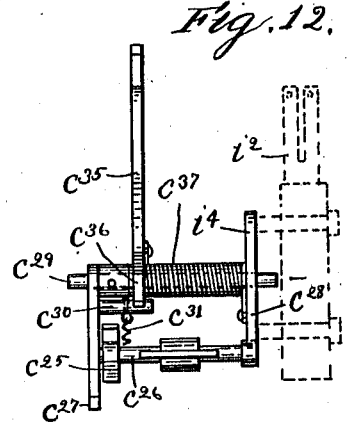
Fig. 11.
Fig. 12.
Witnesses:
H. B. Davis
Cynthia Doyle
Inventor:
Frederick W. Cole
By Hayes & Harriman
Attys.

F. W. COLE.
FIRE AND POLICE TELEGRAPH SYSTEM.
APPLICATION FILED SEPT. 27, 1907.

970,886.

Patented Sept. 20, 1910.
5 SHEETS—SHEET 4.

Witnesses:
H. B. Davis.
Cynthia Doyle.

Inventor:
Frederick W. Cole
by Hayes & Harriman
Attys

F. W. COLE.
FIRE AND POLICE TELEGRAPH SYSTEM.
APPLICATION FILED SEPT. 27, 1907.
970,886.
Patented Sept. 20, 1910.
5 SHEETS—SHEET 5.
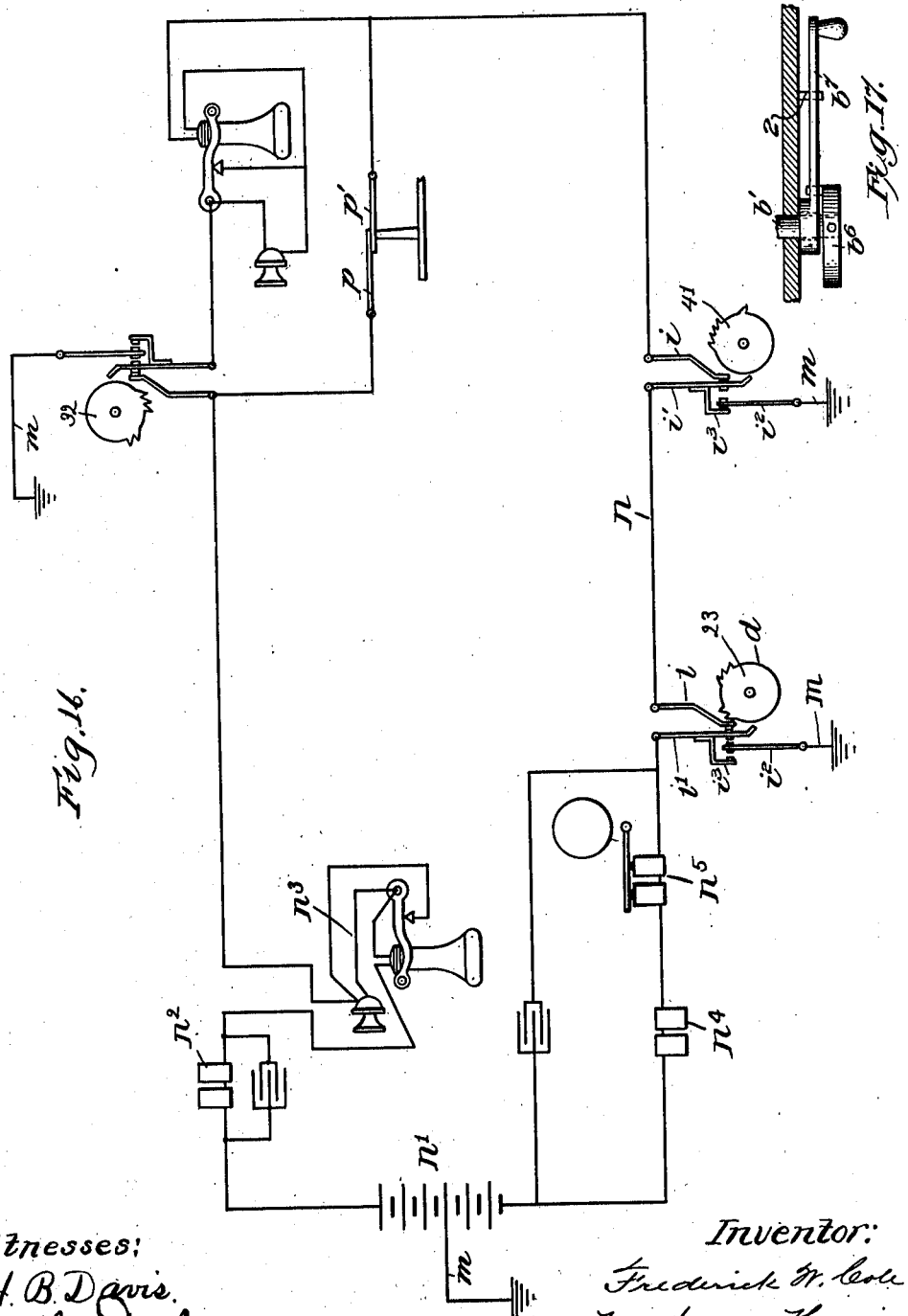
Witnesses:
H. B. Davis.
Cynthia Doyle
Inventor:
Frederick W. Cole
by Noyes & Harriman
Attys.

UNITED STATES PATENT OFFICE.

FREDERICK W. COLE, OF NEWTON, MASSACHUSETTS, ASSIGNOR TO GAMEWELL FIRE-ALARM TELEGRAPH COMPANY, OF NEW YORK, N. Y., A CORPORATION OF NEW YORK.

FIRE AND POLICE TELEGRAPH SYSTEM.

970,886.

Specification of Letters Patent.   Patented Sept. 20, 1910.

Application filed September 27, 1907.   Serial No. 394,783.

*To all whom it may concern:*

Be it known that I, FREDERICK W. COLE, of Newton, county of Middlesex, State of Massachusetts, have invented an Improvement in Fire and Police Telegraph Systems, of which the following description, in connection with the accompanying drawings, is a specification, like characters on the drawings representing like parts.

This invention relates to signal-boxes especially adapted for use in a combined fire and police-signal system.

The object of the invention is to improve and simplify the construction of a box having a multiple signal-transmitter adapted to transmit a fire-signal and several different police-signals. Also to provide for transmitting the fire-signal slowly and for transmitting the several police-signals quickly. Also to provide for transmitting the fire-signal from the outside of the box and for transmitting the police-signals from the inside of the box. Also to provide two actuators for the transmitter, one of which is adapted to be operated from the outside of the box to transmit the fire-signal and the other of which is adapted to be operated when the box door is open to transmit the police-signals. Also to provide non-interfering devices for said actuators, whereby they cannot be manipulated to transmit a false alarm. Also to provide for transmitting a differentiating impulse with some of the police-signals only, whereby a gong, or other audible alarm may be sounded at the receiving-station, said impulse being of the same character as the regular fire-alarm impulses, so that said gong will also respond to the fire-signal. Also to provide the box and also the receiving-station with a telephone and the necessary equipment accompanying it. Also to provide a main battery circuit adapted to be operated by the signal-transmitting-devices, and a secondary circuit which is permanently connected with the main circuit at the middle of the battery and which is adapted to be connected with the main circuit at each box when transmitting the signals, and which is adapted to be operated by the signal-transmitting-devices. Also to provide at the receiving-station two receiving instruments which are included in the main circuit, and for each side of the battery, both of which are adapted to receive the signals under ordinary conditions, but either one or the other of which is adapted to respond under abnormal conditions, so that in any event the fire-signal will be received, and practically all of the police-signals which are transmitted.

Figure 2:
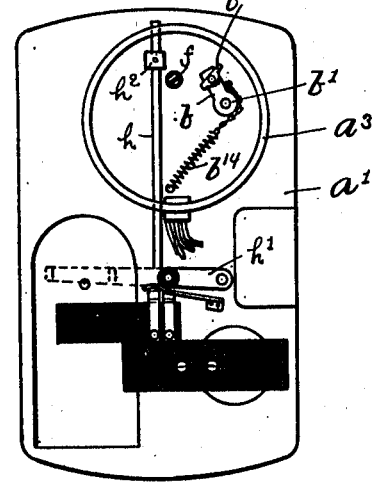
Figure 3:
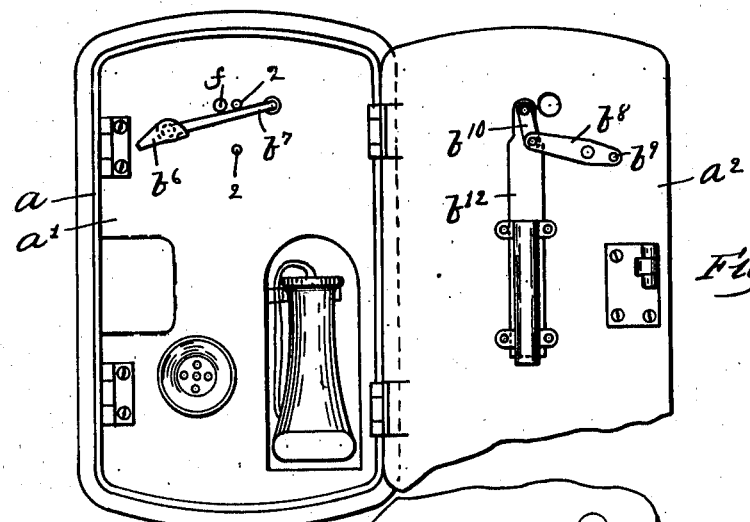
Figure 4:
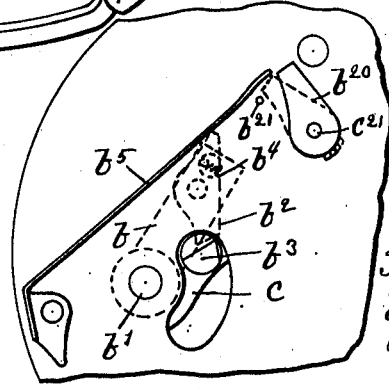
Figure 5:
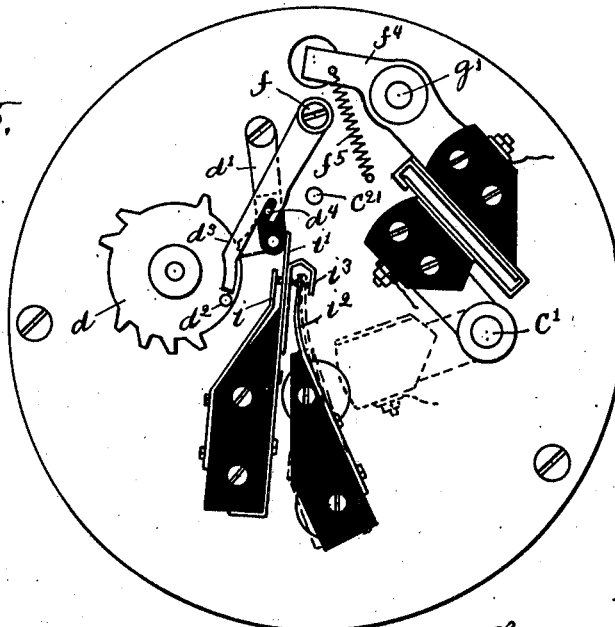
Figures 6, 7:
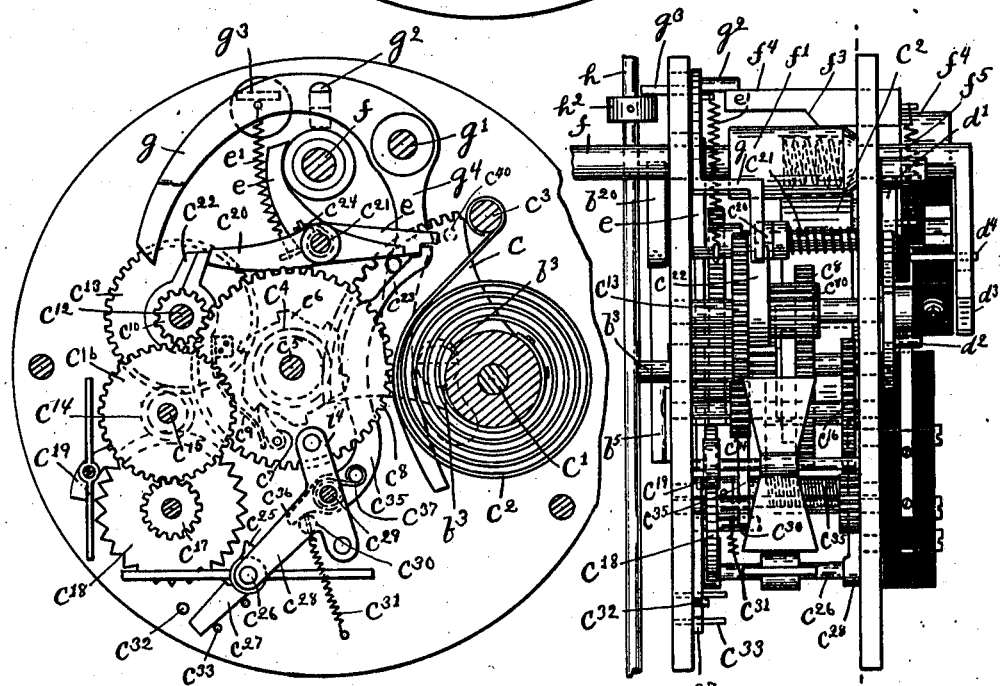
Figure 13:
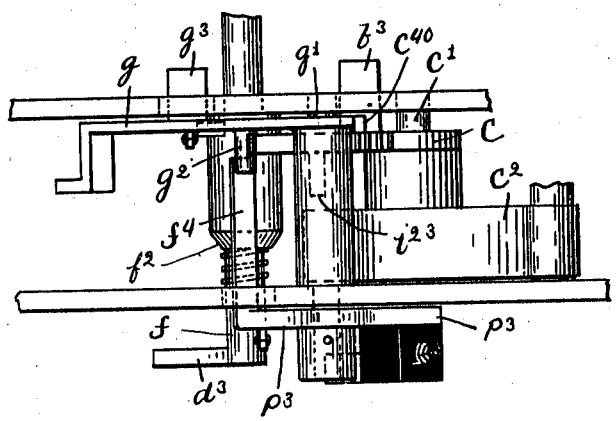
Figure 15:
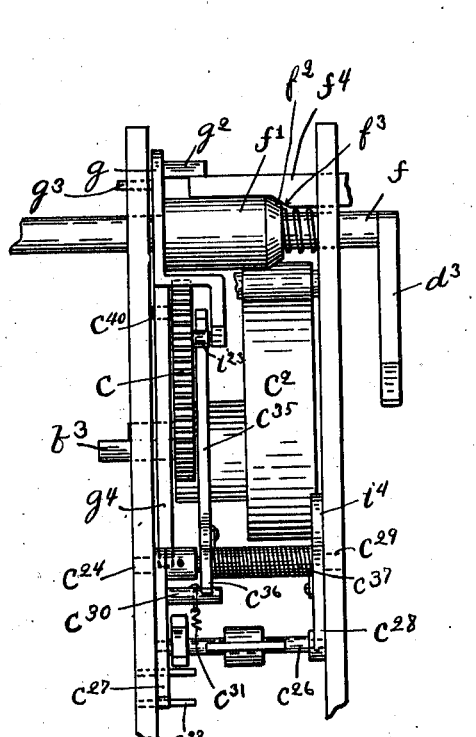
Figure 14:
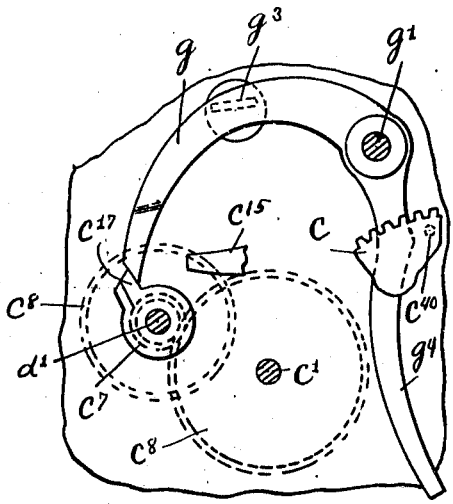

Figure 1, shows in front elevation a combined fire and police signal-box embodying this invention. Fig. 2, is an inside view of the inner door of the box, the signal-transmitter being removed. Fig. 3, is a view of the box with the door open. Fig. 4, is a detail of the non-interfering device for the actuating-lever. Fig. 5, is a front elevation of the signal-transmitter, the parts being represented in their normal position of rest. Fig. 6, is a view showing the signal-transmitter in elevation with one of the side plates removed and the plunger-rod shown in section. Fig. 7, is a side elevation of the signal-transmitter. Figs. 8 and 9, are front views of the signal-transmitter, showing the parts in different positions they will occupy when transmitting the signal. Figs. 10, 11 and 12, are details of the means employed for causing the train to run slowly to transmit the fire-signal. Fig. 13, is a detail showing the plunger-rod and intermediary locking-lever for the train and one of the members of the shunt circuit-closer for the box. Fig. 14, is a detail showing particularly the intermediary locking-lever for the train in the position it will occupy when arresting the train. Fig. 15, is a detail plan view showing the plunger-rod and intermediate locking-lever. Fig. 16, is a diagram of the circuits of the system to be referred to. Fig. 17 is a detail of one of the independent actuators for the transmitter.

Referring to the drawings wherein I have shown one embodiment of my invention for purposes of illustration, $a$ represents the shell of the box or case which is of any suitable size and shape, $a'$ the inner door which is hinged to said shell or case and which serves as a supporting-plate for many of the operating parts, and $a^2$ the outer door. On the inner door the usual telephone set is supported. On the rear side of the inner door $a'$, a multiple signal-transmitter is located which is contained in a cylindrical case $a^3$.

The transmitter is provided with what is ordinarily called a non-interference pull by which it is wound up or otherwise operated.

$b$ represents the actuating-lever of the transmitter which is secured to a short shaft $b'$ extending through the inner door, see Figs. 2 and 4, said lever being located on the inside of said door. The lever bears a pawl $b^2$ which is adapted to engage a stud $b^3$ projecting from the sector $c$ or other winding member of the transmitter. The pawl $b^2$ is pivoted to the lever $b$ and is movable into and out of position to engage the stud $b^3$. When the lever is in its normal elevated position, see Fig. 4, the pawl engages a flat spring $b^5$ by which it is turned on its pivot and moved into position to engage the stud, and as the lever is depressed the pawl engages said stud and remains in engagement therewith by friction, but as soon as downward pressure on the lever is relieved the pawl is moved immediately out of engagement with the stud by a spring $b^4$. The pawl will be held by the spring $b^4$ in its out-of-use position until the lever resumes its normal position and the pawl again engages the flat spring $b^5$. When the lever $b$ is depressed and the pawl $b^2$ has disengaged the flat spring $b^5$, the latter will move downward slightly by its inherent spring action, far enough for its end to occupy a position back of a detent $b^{20}$ which is secured to a pivot-shaft $c^{21}$ of the locking-lever for the train, to thereby prevent movement of said locking-lever by the detent engaging the flat spring, and not until the lever $b$ resumes its normal position and lifts said spring $b^5$ can the locking-lever be moved to release the train. Hence downward movement of said lever $b$ is required to wind the train and upward movement thereof to release it. As soon as the spring $b^5$ is lifted by the lever $b$ resuming its normal position the detent $b^{20}$ is disengaged and the locking-lever permitted to operate.

When the locking-lever is moved to release the train the detent $b^{20}$ will be moved with it into the dotted line position shown in Fig. 4, and at such time it will occupy a position beneath said spring $b^5$ and will act to hold said spring in its elevated position. A lever $b^6$ is also secured to the shaft $b'$, which is located outside of the inner door, see Fig. 3, and two actuators are provided for said lever, one for moving it to move the actuating-lever $b$ a short distance, to operate the transmitter one round, and the other for moving it to move the actuating-lever $b$ a long distance, to operate the transmitter more than one round, as for instance to operate the transmitter four rounds.

$b^7$ represents one of the actuators, which is made as an arm and which is mounted loosely on the shaft $b'$ and provided at its outer end with a hand-piece by which it may be operated, its inner end-portion overlying a projection on the short end of the lever $b^6$, whereby downward movement of the arm moves said lever $b^6$ and turns the shaft $b'$ a short distance. Stop pins 2, 2, on the inner door limit the movement of said arm. $b^8$ represents a lever which forms a part of the other actuator, and said lever is pivoted to the inside of the outer door, and has at one end a projection $b^9$, which, when the door is closed, extends under the long end of the lever $b^6$. The opposite end of the lever $b^8$ is connected by a link $b^{10}$ with the upper end of a sliding bar $b^{12}$, which is mounted on the inside of the outer door and which is provided with a hook $b^{13}$ which extends outwardly through a slot in the door, so as to be accessible from the exterior thereof. As the hook is drawn down the lever $b^8$ is moved on its pivot and the long end of the lever $b^6$ raised to thereby turn the shaft $b'$ in the same direction that it is turned by the actuator $b^7$, but a much longer distance, sufficient to operate the transmitter four rounds. Thus it will be seen that the transmitter may be operated when the outer door is closed to transmit a number of rounds of the signal and when the outer door is open to transmit one round of the signal. When either actuator is drawn down the actuating-lever $b$ is moved and when let go said actuating-lever is immediately restored to its normal position by means of a spring $b^{14}$ which is connected to it. During the return movement of the actuating-lever if either actuator should be again operated the pawl $b^2$ cannot again engage the stud $b^3$.

The winding-member is herein shown as a toothed-sector $c$, secured to a pivot shaft $c'$, and having a hub to which the inner end of the main spring $c^2$ is attached, the outer end of said spring being attached to a post $c^3$. The stud $b^3$ which is engaged by the actuating-lever $b$ is fixed to and projects laterally from one side of said sector. The sector engages a pinion $c^4$, which is mounted loosely on a shaft $c^5$, and to one end of said pinion a ratchet wheel $c^6$ is secured. Said ratchet wheel engages a pawl $c^7$ pivotally mounted on one face of a toothed-wheel $c^8$, and continuously held pressed into engagement with said ratchet-wheel by a spring $c^9$.

The toothed-wheel $c^8$ is secured to the shaft $c^5$, and engages a pinion $c^{10}$ secured to a shaft $c^{12}$, bearing a toothed-wheel $c^{13}$, which engages a pinion $c^{14}$ secured to a shaft $c^{15}$, bearing a toothed-wheel $c^{16}$ which engages a pinion $c^{17}$ secured to a shaft bearing an escape-wheel $c^{18}$ with which coöperates a suitable pallet $c^{19}$. This train is driven by the spring-actuated sector $c$, as the latter returns to its normal position.

The signal-wheel $d$ is secured to one of the shafts of the train, as for instance, to the shaft $c^{12}$, and is arranged to transmit one round of the signal during each complete revolution, and said signal-wheel operates a pivoted signaling-lever $d'$ which engages one of a set of spring-acting contact-pens, as will be described.

When the sector $c$ is depressed a short distance by one of the actuators, as by the arm $b^7$, the train will be set to operate the signal-wheel one complete revolution and hence to transmit one round of the signal, and when the sector is depressed a long distance by the other actuator the train will be set to operate the signal-wheel a number of revolutions and hence to transmit a number of rounds of the signal, as for instance four rounds. To control the setting of the train for one or a number of rounds of the signal, a locking-lever is provided for the train which is controlled by the sector.

$c^{20}$ represents the locking-lever which is secured to a pivot-shaft $c^{21}$, one end of which engages a detent $c^{22}$ secured to the shaft $c^{12}$, or to some other shaft of the train, and the other end of which rests upon a pin $c^{23}$ projecting laterally from the sector $c$. As the sector is depressed the pin $c^{23}$ is removed from beneath the locking-lever and said lever is then permitted to move to disengage the detent $c^{22}$, and is moved by a spring $c^{24}$ which surrounds the pivot-shaft $c^{21}$ and which is attached at one end thereto, as soon as the detent $b^{20}$ is released by the spring $b^5$. Such movement of the locking-lever is limited by a pin $b^{21}$ which is engaged by the arm $b^{20}$. As the sector returns to its normal position the pin $c^{23}$ thereon engages and restores the locking-lever.

Whether the sector is moved a short or a long distance to wind the signaling-train for one or a number of rounds the coöperation of the pin $c^{23}$ with the locking-lever is the same, as the moment the pin is removed from beneath said lever, the said lever is placed under the control of the detent $b^{20}$, and is subsequently permitted to move, and not until said pin $c^{23}$ resumes its normal position will it be restored.

It is designed and intended that the one-round or inside signal, which I have selected as the police-alarm call, shall be transmitted quickly, and the four-round or outside signal, which I have selected as the fire-alarm call shall be transmitted slowly. To accomplish this variation in the speed of the two signals means are herein provided for varying the speed of the train. The means herein shown consists in the provision of a second pallet $c^{25}$, see Figs. 6, 10 and 12, which is normally disengaged from the escape-wheel $c^{18}$, as shown in Fig. 6, but which is adapted to be moved into engagement therewith whenever it is desired to cause the train to run slowly. The second pallet acts conjunctively with the pallet $c^{19}$, to serve as the slow regulating-device for the train, while the pallet $c^{19}$ acting alone serves as the quick regulating-device for the train. When the second pallet is disengaged from the escape-wheel the train will run quickly, being regulated solely by the quick regulating-device $c^{19}$. The pivot-shaft $c^{20}$ bearing the pallet $c^{25}$ has its bearings in a pair of arms $c^{27}$, $c^{28}$, respectively located adjacent the two side plates, and both secured to a pivot-shaft $c^{29}$ having its bearings in said side plates, said arms and the pivot-shaft bearing them constituting a movable frame for supporting said pallet. A pin $c^{30}$ projects laterally from the arm $c^{27}$ to which a spring $c^{31}$ is attached, the function of said spring being to hold the frame with the pallet $c^{25}$ disengaged from the escape-wheel. The movement of the frame is limited by the stop pins $c^{32}$, and $c^{33}$, see Fig. 6.

Means are provided, adapted to be operated by the winding-member of the signal-train, for controlling the movement of the pallet-carrying frame, said means permitting the winding-member to move a short distance to operate the signaling-train one round without moving the pallet-carrying frame, so that the one-round signal may be transmitted quickly, but causing the winding-member, when moved a long distance to wind the signaling-train for a number of rounds, to move the pallet-carrying frame so that the pallet will engage the escape-wheel and the train thereby be caused to run slowly during the entire number of rounds. The means for thus controlling the movement of the pallet-carrying frame consists of an actuating-arm $c^{35}$, loosely mounted on the pivot-shaft $c^{29}$, which is extended upwardly into engagement with the pin $c^{23}$ on the sector, and is curved substantially concentric to the pivot of said sector, and has a cut-away portion near its upper end along which said pin travels, without moving the arm on its pivot, as the sector is depressed a short distance to wind the signaling-train for one round, and has an engaging-portion extending from the lower end of said cut-away portion downward for a considerable distance which is engaged by said pin for the purpose of moving the arm as the sector is depressed a long distance to wind the signaling-train for a number of rounds.

A spiral spring $c^{37}$ surrounds the pivot-shaft $c^{29}$ which is connected at one end to the actuating-arm $c^{35}$ and at the other end to the arm $c^{28}$ of the pallet-carrying frame, and elastically connects said arm $c^{35}$ with the pallet-carrying frame, whereby said frame is moved by said arm, yet each is permitted to be moved independently of the other. The actuating-arm has an extension $c^{36}$, which overlies the pin $c^{30}$ on the arm $c^{27}$, and said pin limits the movement of said arm in one direction. The pallet-carrying frame when moved toward the escape-wheel by the actuating-arm, will remain in such position, with the pallet in engagement with the escape-wheel while the sector returns, the pin $c^{23}$ traveling along the engaging-portion of the arm, and then traveling over the cut-away portion, and to provide against the return of the actuating-arm to its normal position while the pin $c^{23}$, on the return movement of the sector, passes over said cut-away portion, a detent-lever is employed for holding the actuating-arm in its abnormal position during such time. $e$ represents the detent-lever which is employed for this purpose, which, for convenience is mounted loosely on the pivot-shaft $c^{21}$, beside the locking-lever, it being herein shown as a bell-crank lever, one arm of which extends over the pin $c^{23}$ and is provided at its end with an engaging portion which is adapted to engage the arm $c^{35}$, and the other arm of which extends up along side of the plunger-rod $f$ of the box, which latter is designed to be moved inward longitudinally by the closing of the box-door and to be thrust outward by a spring when said door is opened.

The upper end of the arm $c^{35}$ has a notch at one side and the outer end of the detent-lever $e$ has a notch at its under side, and when the parts are at rest, see Fig. 11, and the lever is held in its elevated position by the pin $c^{23}$, it extends over the end of the arm and enters the notch therein, and when the pin $c^{23}$ is moved from beneath the lever by depression of the sector, and the arm $c^{35}$ is moved by said pin $c^{23}$, see Fig. 10, said lever is permitted to move downward, and is so moved by a spring $e'$ which is attached to it, the end of the arm entering the notch in the lever. The lever $e$ is finally restored to its normal elevated position by the pin $c^{23}$, which engages it on the return movement of the sector. The lever $e$, when once depressed, operates to hold the arm $c^{35}$ until restored by said pin, and while said arm is so held by the lever, the pin will travel over its cut-away portion, and all the rounds of the signal will be transmitted slowly, the second pallet engaging the escape-wheel.

The one-round fast signal, which is herein selected as the police-call, is employed as the report-call, and the signal is simply the box-number which is transmitted by breaking the circuit for short periods of time. For police-signaling purposes, however, other signals are quite as important as the report-call, as for instance, the telephone-call and wagon-call, hence I have provided means whereby these two extra calls may be transmitted. As these two extra calls are both important means are provided whereby a differentiating-impulse may accompany them in order that they may be readily distinguished from the report-call. The differentiating-impulse may be simply a long break in the circuit as contrasted with the short breaks of the report-call.

The means herein shown for providing for the transmission of the extra calls consists in providing the signaling-train with an intermediary locking-device, which is adapted to stop the train when the box-number or report-call has been transmitted, but before the signal-wheel has completed its round, and in providing means for opening the circuit for a long period of time, which is adapted to be operated by said train when said intermediary locking-device is operated to release it while the door of the box is still open. The differentiating-impulse thus transmitted, following the box-number produces the telephone-call. Means are also provided for releasing said intermediary locking-lever by the act of pulling the box a second time while the box door is still open, the differentiating-impulse being then transmitted, and the box-number repeated, following said differentiating-impulse, such call being the wagon-call and being readily distinguished from the other calls by the differentiating-impulse being arranged between the two box-numbers.

$g$, Figs. 6, 13 and 14, represents the intermediary locking-lever which is mounted loosely on the pivot-shaft $g'$, and has its engaging end arranged to engage the detent $c^{22}$ of the signaling-train. It is moved into its locking position by the spring $e'$, which is attached to it, when said spring is permitted to act, and it is moved into its unlocking position, as herein shown, by the plunger $f$, and by means controlled by the removal of the telephone from its support, and by means operated by pulling the box, these several different means for moving it being employed at different times and under different conditions. As the intermediary locking-lever is used only in connection with the police-calls it is held out of action while the fire-call is being transmitted, and as the police-calls are all transmitted when the box door is open and the fire-call when the box door is closed the plunger $f$ is employed to move the intermediary locking-lever into and to hold it in its unlocking position when the box door is closed, permitting it to move into its locking position only when the box door is open.

The plunger $f$ has a collar $f'$ formed with a beveled end $f^2$ which is adapted to engage an inclined portion $f^3$ on an arm $f^4$ which is bent to project through a hole in the side plate and which is secured to the pivot-shaft $g'$. Inward movement of the plunger operates to raise said arm against the tension of a spring $f^5$, Fig. 5, which latter acts to draw the arm downward when the plunger is moved outward. The intermediary locking-lever $g$ has a pin $g^2$ extended from it which extends over the arm $f^4$, Fig. 15, and as said arm is raised by the plunger the locking-lever $g$ will be raised out of the path of movement of the detent $c^{22}$, and when the arm descends the locking-lever will be caused to occupy a position in the path of movement of said detent. Thus when the box door is closed the intermediary locking-lever is positively held out of action by the plunger and is permitted to operate only when the box door is open. The intermediary locking-lever has also projecting from it a lug $g^3$, which extends through a hole in the side plate, which is adapted to be engaged by means operated by the telephone-support when the telephone is removed therefrom to thereby raise the intermediary locking-lever, Figs. 2 and 7. As herein shown, a bar $h$ is supported vertically near one of the side plates which rests by gravity upon the pivoted supporting-arm $h'$ for the telephone, and said bar has fixed to it, near its upper end, a collar $h^2$ which projects beneath the lug $g^3$ on the intermediary locking-lever, and when the telephone is removed from its support and said support thereby permitted to rise said bar will be correspondingly raised and by its engagement with the intermediary locking-lever will raise said lever and thereby remove it from the path of engagement with the detent $c^{22}$. The intermediary locking-lever $g$ also has an extension $g^4$ provided with a curved engaging-portion, see Figs. 6 and 14, which extends down alongside of the sector $c$, which is adapted to be engaged by a pin $c^{40}$ on said sector, as the latter is depressed, to thereby move said locking-lever into its unlocking position to release the train.

The pin $c^{40}$ is disposed a short distance from the extension $g^4$, so as not to engage it immediately the sector starts downward, in fact, not until the sector has been moved downward and almost far enough to wind the train for one round. If the intermediary locking-lever is in its unlocking position when the sector is depressed then the pin $c^{40}$ will not engage the extension $g^4$.

To provide for transmitting the differentiating-impulse the signal-wheel $d$ has projecting from it a pin $d^2$, which at times can engage an arm $d^3$, loosely pivoted to the end of the plunger-rod $f$, and moves said arm on its pivot for a period of time that the pin engages it. The arm $d^3$ is forked to receive a pin $d^4$ projecting from the signaling-lever $d'$, and as it is moved on its pivot by the pin on the signal-wheel said signaling-lever will, therefore, be moved to operate the circuit contacts.

The pin $d^2$ on the signal-wheel is made quite short and the arm $d^3$ which it engages, being supported on the plunger-rod, is movable by said rod toward and from said pin, in the direction of its length, so that when the plunger-rod is thrust inward by closing the box door said arm will be moved beyond the path of engagement with said pin, and in such case the signal-wheel will complete its round without operating said arm, but when the plunger-rod is in its outermost position, the door being open, said arm is brought into position to be engaged by said pin. The means for effecting the transmission of the differentiating-impulse is, therefore, controlled by the plunger-rod, which is controlled by the box door, and will be set to transmit said impulse only when the box door is open, which it will be understood is when the fast or police calls are being transmitted.

When the fast-call is transmitted, the box door being open, the train will be stopped by the intermediary locking-lever as soon as the box-number has been transmitted, and when only the report-call is desired to be sent the box door will then be closed, and upon closing the door the plunger will be thrust inward, the arm $d^3$ moved out of the path of movement of the pin $d^2$, and the intermediary locking-lever raised to release the train, permitting it to run and complete its round.

When it is desired to transmit the telephone-call the fast-call will be transmitted and the telephone removed from its support, and said locking-lever will thereby be raised and the train permitted to complete its round, during which time the differentiating-impulse will be transmitted by the pin $d^2$ engaging the arm $d^3$.

When it is desired to transmit the wagon-call the fast-call will be transmitted and the signaling-train stopped by the intermediary locking-lever. The actuator will then be pulled a second time, thereby again operating the winding-member $c$, and the pin $c^{40}$ thereon will engage the extension $g^4$ on said locking-lever and will move the locking-lever into its unlocking position and release the train. On the return movement of the winding-member the differentiating-impulse will then be transmitted, and the train will continue running for another round, the box-number will be again transmitted and the pin $c^{40}$ will disengage the extension $g^4$, and the signaling-train will be again stopped by the intermediary locking-lever. Upon closing the box door the arm $d^3$ will be moved out of the path of the pin $d^2$ and the intermediary locking-lever will be moved by the plunger into its unlocking position and the train thereby released and permitted to complete its operation. When the train is stopped by the intermediary locking-lever the winding-member has so nearly returned to normal position that the pin $b^3$ is close to the pawl $b^2$ on the lever $b$, so that, when said lever is a second time depressed, the pawl will engage the pin $b^3$ before it is permitted to swing out by disengagement with the spring $b^5$. The wagon-call thus transmitted will comprise two box-numbers and a differentiating-impulse between them. Thus the telephone-call and the wagon-call each include a differentiating-impulse.

When the door is closed and the plunger thrust inward and the arm $d^3$ moved out of the path of movement of the pin $d^2$ and the outside or fire-call is being transmitted, if at such time the box door should be opened, inadvertently, the plunger would, unless prevented, be thrust outward and the arm $d^3$ moved into position to be engaged by the pin $d^2$, and a long break be transmitted with the fire-call which would confuse it, and to obviate this, means are provided for preventing the plunger moving outwardly at such time.

Referring to the detent-lever $e$, see Figs. 6 and 10, the arm of said lever which extends up alongside of the plunger-rod $f$, is normally held out of engagement with said rod by the other arm of the detent-lever engaging the pin $c^{23}$ on the sector $c$, but when said sector is wound the lever $e$ engaging it descends first upon the arm $c^{35}$ and as the sector is further wound the pin $c^{23}$ engages the raised portion of lever $c^{35}$, swinging the same on its pivot to the right and from beneath the lever $e$ and allowing said lever $e$ to further descend and its upwardly extended arm is also moved toward the plunger-rod, into a position back of the collar $f'$ on said rod. In case the box door should be opened at such time the plunger is prevented from moving outwardly by the end of the collar $f'$ thereon engaging the side of the arm. When the parts resume their normal positions the arm $e$ is restored by the pin $c^{23}$ on the sector just before it runs down. Hence even if the box door should be opened while the fire-signal is being transmitted the signal can not be confused by the transmission of the differentiating-impulse.

In my Patent #898,095, dated Sept. 8th, 1908, an intermediary locking-device is provided for arresting the signaling-train when one of the signals has been transmitted, which is adapted to be moved into its unlocking position to release the train and permit it to continue its operation and transmit a different signal; also, in said application the intermediary locking-device is adapted to be moved into its unlocking position by means connected with the telephone-support, whereby, upon the removal of the telephone from its support said lever may be moved and the train released and permitted to continue its operation to transmit a different signal; also, in said application the intermediary locking-device is adapted to be moved into its unlocking position by closing the box door; therefore these features are not herein broadly claimed.

$i$ and $i'$, see Figs. 8 and 9, represent a pair of spring-acting contact-pens which are respectively connected to the wires of the main circuit $n$, which is herein represented as a metallic circuit having a battery $n'$, and said pens are normally in engagement by their inherent spring action, so as to maintain said circuit closed, and one of said pens, as $i'$, is made longer than the other and is adapted to be engaged by the signaling-lever $d'$ for the purpose of separating the pens to open the circuit. In the diagram Fig. 16, the signaling-lever $d'$ is omitted for sake of clearness. $i^2$ represents another spring-acting contact-pen which is connected to a secondary circuit $m$, which may be a ground circuit leading to the middle of the battery $n'$, or, obviously, it may be a separate wire running parallel to the circuit $n$ and leading from the middle of said battery; and said contact-pen $i^2$ is adapted to be engaged by the contact-pen $i'$ to connect it with the main circuit $n$.

The contact-pen $i'$ is provided with a hook $i^3$, which extends over the end of the contact-pen $i^2$, and said pen $i^2$ is provided with a double contact so as to be engaged at one side by the contact-pen $i'$ and at the opposite side by the hook $i^3$. The pen $i^2$ normally occupies a position midway between the pen $i'$ and hook $i^3$, so that the secondary circuit is normally open.

The supporting-block bearing the pen $i^2$ is made movable, so that the pen borne by it may be moved into engagement with the hook $i^3$, and to provide for moving said block it is attached to a plate $i^4$, which is formed integral with or attached to the arm $c^{28}$ of the movable pallet-bearing frame. By attaching the supporting block of the pen $i^2$ to said pallet-bearing frame, it will be moved with the frame, and as said frame is moved only when the slow-signal or fire-call is being transmitted it will be seen that said pen $i^2$ will only be moved into engagement with the hook at such time. At all other times said pen remains in its normal position. When the pen $i^2$ has thus been moved into engagement with the hook $i^3$, movement of the pen $i'$ by the signal-wheel separates the main contact pens $i$ and $i'$, and also separates the hook from the contact pen $i^2$, thereby breaking both the main and secondary or ground circuits simultaneously. When the pen $i^2$ remains in its normal position, movement of the pen $i'$ by the signal-wheel separates the main contact pens $i$ and $i'$, but first closes the pen $i'$, with the pen $i^2$ thereby first connecting the main circuit with the secondary or ground circuit and thereafter breaking the main circuit at one side of the grounded place only.

The main circuit $n$, at one side of the battery $n'$, is provided with a signal-receiving relay $n^2$ and with the usual telephone set, which is represented at $n^3$, and at the opposite side of the battery is provided with a signal-receiving relay $n^4$ and with a gong $n^5$, and one of said relays, as $n^2$ for instance, may be employed particularly to operate the recording instrument for recording the fast-signals for police and the other relay, as $n^4$, may be employed particularly to operate the recording instrument for recording the slow-signals for fire. In practice a double pen register may be employed which is adapted to be operated or controlled by said relays.

The contact pens $i$ of all of the boxes in the circuit will be arranged to be connected to the same side of the main circuit, so that the relay between said boxes and the battery, on that side of the line will be effected by said pen in operating.

When transmitting the slow-signals or fire-call the pen $i^2$ is moved into engagement with the hook $i^3$, thereby connecting it with the main circuit $n$ before the main circuit is broken for the first time by the signal-wheel, as represented at box marked 41, then as the signal-wheel revolves said secondary circuit is opened and closed in unison with the main circuit, and the signal is received on both relays.

In case the main circuit is broken when the box is pulled the signal would then be received over the unbroken side of the main circuit and the secondary circuit, and the relay on that unbroken side of the main circuit would receive the signal. In case the slow-signal of two boxes were pulled at the same time there would be no loss of signals, as one signal would be transmitted correctly over one side of the main circuit and the secondary circuit, and the other signal would be transmitted correctly over the other side of the main circuit and the secondary circuit, and both signals would be received and recorded on the recording instruments on their respective sides.

If a second box was pulled for the slow-signal while another box was transmitting its slow-signal, the second box would immediately take control of the receiving apparatus at its own side of the main circuit, and would add its signal to that portion of the signal already received by the first box on that side of the line, but it would not interfere in any way with the proper reception of the first signal on the opposite side of the circuit.

When transmitting the fast-signal or police-alarm the pen $i^2$ will remain in its normal position, as represented at box marked 23, or the one marked 32, then as the signal-wheel revolves the pen $i^2$ will not be engaged by the pen $i'$ until the latter has been moved slightly and just before it disengages the pen $i$. The closures of the secondary circuit will, therefore, be only momentary during the transmission of the signal and each closure will be just long enough to keep the fire-alarm side of the circuit closed on each break. This arrangement will permit the fast-signal to be transmitted over either side of the main circuit in emergencies such as a broken line, and furthermore it gives the least possible chance for interference of police-signals with the more important fire-signals, the danger of which or of added complications to prevent such, having been one of the strong objections to a combination police and fire-alarm system. The fast time of the police-signals has also in practice been found to reduce the chances of an interference between police-signals to a minimum.

The complete police-signal requires but three or four seconds, and as the telephone receiver of a box is cut into circuit when the box door is open as will be hereinafter described, the officer at the box desiring to transmit a signal could readily hear the clicking of the telephone in the box if another fast-signal was being transmitted and therefore could wait at most but a few seconds for the first signal to be completed when he could thereafter send his signal promptly without error or confusion.

If a slow-signal should be started simultaneously with a fast-signal and the police-signal should be on the fire-alarm side of the circuit from the box which was operated to transmit the fire-signal, then although the police-signal would be lost yet the chances of any serious trouble with the slow fire-signal would be remote. The fact that the fast-signal did not close on the ground contact pen $i^2$ continuously would enable the fire-bells to respond to the breaks of the circuit caused by the slow-signal, which would overlap the rapid closures through the ground of the fast-signal and during closures of the slow-signal the circuit on the fire alarm side would not be operated by the police-signal in any event and a blow on the bells would be received from each break of the slow-signal and the only thing that could happen might be two blows caused by two of the quick closures through the ground of the interfering fast-signal during the break on the slow-signal and this would appear however only as a double blow on the bells, hearing which the person counting the alarm would wait for another round for safety, and thus no fire-signal would be lost even from such a combination of conditions.

As the fire-signal is slow its breaks in the circuit are of necessity long, and as the fast-signals are composed of short breaks, accompanied or not with a break of long duration, the gong or any other audible alarm may be easily arranged to operate on the long breaks and thereby immediately indicate the reception of the slow-signal and such fast-signals as are accompanied by a long break.

The box herein is provided with a shunt circuit closer for closing a heavy shunt circuit around the box when the parts are at rest and the box door closed.

$p$ represents one member of the shunt circuit closer and $p'$ the other member thereof. The member $p$ is secured to an arm $p^2$ which is connected with the pivot-shaft of the winding-member of the transmitter and is movable toward and from the other member by said winding-member.

The member $p'$ is connected to an arm $p^3$ which is secured to the pivot-shaft $g'$, and also has an extension which is bent at a right angle, which passes through a hole in the plate and is moved by the arm $f^4$, which it will be remembered, is operated by the plunger. For the members of said circuit-closer to close, the plunger must be thrust inward, which is done by the door in closing, and the winding-member must occupy its normal position of rest. The shunt circuit-closer thus constructed, it will be seen, is controlled not only by the winding-member but also by the door of the box for the member $p$ which forms one side of the shunt, is carried and closed by the signal train in running down and manually opened by the act of pulling the box and the member $p'$ which forms the opposite side of the shunt is operated by the door of the box, and held in its closed position when the door of the box is closed.

Having thus described my invention, what I claim as new and desire to secure by Letters Patent is:—

1. In a signal-box, the combination with a signal-transmitter having a winding-member, a pivoted actuating-lever adapted to engage said winding-member, a lever secured to the pivot-shaft of said actuating-lever, and two independent actuators for engaging said levers to turn the pivot-shaft and thereby operate the actuating-lever, substantially as described.

2. In a signal-box, the combination with a signal-transmitter having a winding-member, a pivoted actuating-lever adapted to engage said winding member, a lever secured to the pivot-shaft of said actuating-lever and two independent actuators adapted to respectively engage the opposite ends of said lever and move it in the same direction to turn the pivot-shaft and thereby operate the actuating-lever, substantially as described.

3. In a signal-box having an inner door and an outer door, the combination with a signal-transmitter having a winding-member, a pivoted actuating-lever adapted to engage said winding-member, a lever secured to the pivot-shaft of said actuating-lever, a pivoted actuator on the inner door and a sliding actuator on the outer door, both of said actuators being constructed and arranged to engage said lever and turn the pivot-shaft and thereby operate the actuating-lever, substantially as described.

4. In a signal-box, the combination with a signal-transmitter having a winding-member, a pivoted actuating-lever having a pawl position to engage said winding-member, a means for moving said pawl into and out of position to engage said windng-member, a lever secured to the pivot-shaft of said actuating-lever and two independent actuators for engaging said lever to turn the pivot-shaft and thereby operate the actuating-lever, substantially as described.

5. In a signal-box, the combination with a signal-transmitter having a winding-member, a locking-lever for said transmitter, a detent on the pivot-shaft of said locking-lever, a flat spring adapted to be moved into position to obstruct movement of said detent and thereby hold the locking-lever, a pawl normally engaging said flat spring and also the actuating member, downward movement of said actuating-lever to operate the winding-member disengaging the pawl from the spring, permitting it to move to obstruct the detent, and upward movement of said actuating-lever causing the pawl to engage said spring and to be thereby turned on its pivot into position to again engage the winding-member, and also to lift said spring to release the detent, substantially as described.

6. In a signal-box, the combination of a signal-transmitting device, a train for operating it, having an escape-wheel and pallet, a second pallet for said escape wheel, a movable frame bearing it, two actuators for said train, and means, operated by one of said actuators only, for moving the pallet-bearing frame to move the pallet into engagement with the escape-wheel, substantially as described.

7. In a signal-box, the combination of a signal-transmitting device, a train for operating it, a winding-member for said train, two actuators, one for operating said winding-member to wind the train for one round and the other for operating said winding-member to wind the train for a number of rounds, and means, operated by said winding-member, when operated by one of said actuators, for varying the movement of the train, to thereby transmit its signal at a different speed, substantially as described.

8. In a signal-box, the combination of a signal-transmitting device, a train for operating it having a fast-moving regulating-device, a winding-member for said train, two actuators for said winding-member, adapted to respectively wind the train for one or a number of rounds of the signal, a slow-moving regulating-device for said train, and means, operated by one of said actuators only, for moving said slow-moving regulating-device into engagement with the train, substantially as described.

9. In a signal-box, the combination of a signal-transmitting device, a train for operating it having a fast-moving regulating-device, a slow-moving regulating-device for the train, a winding-member for the train, means for operating it to wind the train for one or a number of rounds of the signal, means operated by said winding-member for moving said slow-moving regulating-device into engagement with the train, and means for holding said device in engagement with the train while the entire signal is being transmitted, substantially as described.

10. In a signal-box, the combination of a signal-transmitting device, a train for operating it having a fast-moving regulating-device, a slow-moving regulating-device for the train, a winding-member for the train, means for operating it to wind the train for one or a number of rounds of the signal, an actuating-device for said slow-moving regulating-device, means for operating it, and a locking-device for said actuating-device, the operation of which is controlled by said winding-member, substantially as described.

11. In a signal-box, the combination of a signal-transmitting device, a train for operating it having a fast-moving regulating-device, a slow-moving regulating-device for said train, a winding-member for the train, means for operating it to wind the train for one or a number of rounds of the signal, and an actuating-device for said slow-moving regulating-device adapted to be operated by said winding-member when the latter is moved to wind the train for a number of rounds of the signal only, substantially as described.

12. In a signal-box, the combination of a signal-transmitting device, a train for operating it having a fast-moving regulating-device, a slow-moving regulating-device for said train, a winding-member for the train, means for operating it to wind the train for one or a number of rounds of the signal, an actuating-device for said slow-moving regulating-device adapted to be operated by said winding-member when the latter is moved to wind the train for a number of rounds of the signal only, a locking-device for said actuating-device, means for operating it when the actuating-device is moved and means for restoring it at the end of the last round of the signal, substantially as described.

13. In a signal-box, the combination of a signal-transmitting device, a train for operating it having a fast-moving regulating-device, a slow-moving regulating-device for said train, a winding-member for the train, means for operating it to wind the train for one or a number of rounds of the signal, an actuating-device for said slow-moving regulating-device adapted to be operated by said winding-member when the latter is moved to wind the train for a number of rounds of the signal only, a locking-device for said actuating-device, means controlled by the actuating-device for moving it to lock the actuating-device, and means operated by the winding-member at the end of the last round of the signal for restoring said locking-device, substantially as described.

14. In a signal-box, the combination of a signal-transmitting device, a train for operating it having a fast-moving regulating-device, a slow-moving regulating device for said train, a winding-member for the train, means for operating it to wind the train for one or a number of rounds of the signal, an actuating-device for said slow-moving regulating-device adapted to be operated by said winding-member, and constructed and arranged to permit said member to be operated to wind the train for one round of the signal without moving said actuating-device and to be moved by said winding-member when the latter is operated to wind the train for more than one round of the signal, substantially as described.

15. In a signal-box, the combination of a signal-transmitting device, a train for operating it having a fast-moving regulating-device, a slow-moving regulating-device for said train, a winding-member for the train, means for operating it to wind the train for one or a number of rounds of the signal, an actuating-device for said slow-moving regulating-device adapted to be engaged by said winding-member only, when the latter is operated to wind the train for more than one round of the signal and means for holding said actuating-device when operated by the winding-member during the last round of the signal and while it is disengaged by said winding-member, substantially as described.

16. In a signal box, a signal-transmitter having a winding-member, two actuators for respectively operating it to wind the transmitter for one or a number of rounds, means for setting the transmitter to transmit different signals when operated by one of said actuators, an intermediary locking-device for the transmitter, controlled by said signal-setting means, which when in locking position stops the transmitter at an intermediate part of its operation, when one of its signals has been transmitted, and which when moved into its unlocking position releases the transmitter and permits a different signal to be transmitted, substantially as described.

17. In a signal-box, a signal-transmitter having a winding-member, two actuators for respectively operating it to wind the transmitter for one or a number of rounds, means for setting the transmitter to transmit different signals when operated by one of said actuators, an intermediary locking-device for arresting the transmitter at an intermediate part of its operation, when one of its signals has been transmitted, and means for moving said locking-device into its unlocking position to enable the transmitter to operate and transmit a different signal, substantially as described.

18. In a signal-box, a signal-transmitter having a winding-member, two actuators for respectively operating it to wind the transmitter for one or a number of rounds, means for setting the transmitter to transmit different signals when operated by one of said actuators, an intermediary locking-device for the transmitter, controlled by the signal-setting means, and movable into its locking-position to stop the transmitter at an intermediate part of its operation when one of its signals has been transmitted and adapted to be subsequently moved by the signal-setting means into its unlocking position to release the transmitter and permit it to resume and complete its operation, substantially as described.

19. In a signal-box, a signal-transmitter having a winding-member, two actuators for respectively operating it to wind the transmitter for one or a number of rounds, means for setting the transmitter to transmit different signals when operated by one of said actuators, an intermediary locking-device for the transmitter, controlled by the signal-setting means and movable into its locking position to stop the transmitter at an intermediate part of its operation when one of its signals has been transmitted and adapted to be subsequently moved into its unlocking position by the closing of the box door to release the transmitter and permit it to resume and complete its operation, substantially as described.

20. In a signal-box, a signal-transmitter having a winding-member, two actuators for respectively operating it to wind the transmitter for one or a number of rounds, means for setting the transmitter to transmit different signals when operated by one of said actuators, an intermediary locking-device for the transmitter, controlled by the signal-setting means and movable into its locking position to stop the transmitter at an intermediate part of its operation when one of its signals has been transmitted and adapted to be subsequently moved into its unlocking position by the closing of the box door to release the transmitter and permit it to resume and complete its operation but not to transmit another signal, substantially as described.

21. In a signal-box having a telephone and a supporting-hook for the telephone, a signal-transmitter having a winding-member, two actuators for respectively operating it to wind the transmitter for one or a number of rounds, means for setting the transmitter to transmit different signals when operated by one of said actuators, an intermediary locking-device for arresting the transmitter at an intermediate part of its operation when one of its signals has been transmitted, and means connected with the telephone hook, for moving said locking-device into its unlocking position when the telephone is removed from its hook to permit the transmitter to operate and transmit a different signal substantially as described.

22. In a signal-box, a signal-transmitter having a winding-member, two actuators for respectively operating it to wind the transmitter for one or a number of rounds, a plunger controlled by the box door for setting the transmitter to transmit different signals when operated by one of said actuators, a locking-device for arresting the transmitter at an intermediate part of its operation, and means operated by said plunger for operating said locking-device to release the transmitter, permitting it to resume its operation, substantially as described.

23. In a signal-box, a signal-transmitter having a winding-member, two actuators for respectively operating it to wind the transmitter for one or a number of rounds, means for setting the transmitter to transmit different signals when operated by one of said actuators, an intermediary locking-device for arresting said transmitter at an intermediate part of its operation, when one of the signals has been transmitted and means operated by the winding-member for moving said locking-device into its unlocking position to release the transmitter and permit it to transmit a different signal, substantially as described.

24. In a signal-box, a signal-transmitter having a winding-member, means for setting it to transmit different signals, which is controlled by the opening and closing of the box door, and an intermediary locking-device for said transmitter, which is moved into its locking position by opening the door and which is moved into its unlocking position by the winding-member, substantially as described.

25. In a signal-box, a signal-transmitter having a winding-member, means for setting it to transmit different signals, an intermediary locking-device for arresting said transmitter at an intermediate part of its operation, when one of its signals has been transmitted, and means operated by the winding-member for moving said locking-device into its unlocking position to release the transmitter and permit it to transmit a different signal, substantially as described.

26. In a signal-box, a train, a signal-wheel operated by it bearing a pin, a signaling-lever operated by said signal-wheel, an arm engaging said signal-lever and means for moving said arm into and out of the path of movement of said pin, substantially as described.

27. In a signal-box having a plunger controlled by the box door, a train, a signal-wheel operated by it bearing a pin, a signaling-lever operated by said signal-wheel, an arm engaging said signaling-lever which is connected with said plunger, whereby it is movable into and out of the path of movement of said pin, substantially as described.

28. A normally closed main circuit containing a battery, a normally open secondary circuit leading from the middle of said battery, a circuit-breaker in said closed circuit, a circuit-closer for connecting said secondary circuit with the main circuit, means operated by the box-actuator for operating said circuit-closer to connect the secondary circuit with the main circuit, and means operated by the signal-wheel of the box for subsequently operating both circuit-operating-devices, to open the main circuit and to disconnect the secondary circuit from the main circuit, substantially as described.

29. A signal-box having a telephone, a signal-transmitter, having a winding-member, a plunger controlled by the box door, a shunt circuit-closer for the telephone and signal-transmitter, one member of which is connected with the winding-member of the transmitter, and the other member of which is operated by said plunger, substantially as described.

30. In a signal-box, a signal-transmitter having a winding-member, a plunger controlled by the box-door, a shunt circuit-closer for the transmitter, one member of which is connected with the winding-member of the transmitter and the other member is operated by the plunger, substantially as described.

31. A signal-transmitter, means for operating it to transmit signals at two different speeds, and means for transmitting a differentiating-impulse with some of the fast-signals, which corresponds to the impulses of the slow-signals, substantially as described.

32. A signal-transmitter, means for operating it to transmit one round of its box-number signal fast, and means for operating it to transmit several rounds of its box-number signals slow, and means for transmitting a differentiating-impulse with a fast-signal, which corresponds to the impulses of the slow-signal, substantially as described.

33. A normally closed main circuit containing a battery, a normally open secondary-circuit leading from the middle of the battery, a circuit-breaker in said main circuit, a circuit-closer for connecting said secondary circuit with the main circuit, means for operating said circuit-breaker and said circuit-closer at slow speed to open both the main and secondary circuits simultaneously, and means for operating them fast to close and open the secondary and the main circuits alternately, substantially as described.

34. A normally closed main circuit containing a battery, a normally open secondary circuit leading from the middle of the battery, a signal-transmitter, means for operating it at a fast speed to connect the secondary circuit with the main circuit and thereafter open and close both circuits simultaneously upon each signal impulse, and means for operating it at a slow speed to connect the secondary circuit with the main circuit and open and close the main circuit at one side thereof upon each signal impulse, substantially as described.

35. A normally closed main circuit containing a battery and having receiving instruments at both sides of the battery, a normally open secondary circuit leading from the middle of the battery, a signal-transmitter, means for operating it at a slow speed to connect the secondary circuit with the main circuit and thereafter open and close both circuits simultaneously upon each signal impulse, to thereby operate the receiving instruments at both sides of the battery, and means for operating said transmitter at a fast speed to connect the secondary circuit with the main circuit and open and close the main circuit at one side thereof upon each signal impulse, to thereby operate the receiving instrument at one side of the battery only, substantially as described.

In testimony whereof, I have signed my name to this specification, in the presence of two subscribing witnesses.

FREDERICK W. COLE.

Witnesses:
B. J. NOYES,
H. B. DAVIS.